United States Patent
Puspurs (12) 
(10) Patent No.: US 6,330,762 B1
(45) Date of Patent: Dec. 18, 2001

(54) MULCHING STRUCTURE WITH IRRIGATION APERTURES

(76) Inventor: August Puspurs, 3395 Somerset, Saint-Laurent, Quebec (CA), H4K 1R7

(*) Notice: Subject to any disclaimer, the term of this patent is extended or adjusted under 35 U.S.C. 154(b) by 0 days.

(21) Appl. No.: 09/358,448

(22) Filed: Jul. 22, 1999

Related U.S. Application Data (60) Provisional application No. 60/093,597, filed on Jul. 21, 1998.

(51) Int. Cl.$^7$ ............................ C09K 17/52; A01G 13/10
(52) U.S. Cl. ...................................... 47/9; 47/32.4
(58) Field of Search ............................... 47/9, 26, 32, 23, 47/25

(56) References Cited

U.S. PATENT DOCUMENTS

| | | | | |
|---|---|---|---|---|
| 1,372,999 | * | 3/1921 | Eckart | 47/9 |
| 3,315,408 | * | 4/1967 | Fisher | 47/9 |
| 4,984,384 | * | 1/1991 | Kaufmann | 47/9 |
| 5,205,068 | * | 4/1993 | Solomou | 47/9 X |
| 5,274,951 | * | 1/1994 | Besing | 47/9 X |
| 5,647,951 | * | 7/1997 | Bayer | 47/9 XZ |
| 6,195,935 | * | 3/2001 | Bellucci et al. | 47/9 |

* cited by examiner

Primary Examiner—Peter M. Poon
Assistant Examiner—Jeffrey L. Gellner (57) ABSTRACT

A mulching structure for covering the soil around the stem of a growing plant and over the roots thereof to screen sunlight from the adjacent soil and thus minimize the growth of weeds. The mulching structure also allows water from irrigation or rain to flow therethrough to the soil. The mulching structure includes a first wall made out of a substantially impermeable material. The first wall is provided with a first wall aperture extending therethrough. The mulching structure also includes a second wall made out of a substantially impermeable material. The second wall has a second wall aperture extending therethrough. A wall spacing structure extends between the first and second walls for maintaining the latter in a spaced relationship relative to each other. The mulching structure is so configured as to allow through flow of the water between the first and second wall apertures while preventing through passage of the light rays from the first wall outer surface to the second wall outer surface. The first wall and the second wall extend in a generally parallel relationship relative to each other. The first wall aperture is configured, sized and positionned so that its geometrical projection on the second wall in a direction perpendicullar to the first wall is offset relative to the second wall aperture. Similarly, the second wall aperture is configured, sized and positionned so that its geometrical projection on the first wall in a direction perpendicullar to the second wall is offset relative to the first wall aperture.

11 Claims, 5 Drawing Sheets

MULCHING STRUCTURE WITH IRRIGATION APERTURES

This application claims benefit of provisional application 06/093,597, filed Jul. 21, 1998.

FIELD OF THE INVENTION

The present invention relates to the field of agricultural devices and is particularly concerned with a mulching structure.

BACKGROUND OF THE INVENTION

It is common practice in the field of agriculture and gardening to use so called mulches. The mulches are protective coverings spread or left upon the ground. The mulching material is typically used to cover the soil around the stem of a growing plant and over the roots thereof to screen sunlight from the adjacent soil and thus minimize the growth of weeds.

The mulching material also allows water from irrigation or rain to percolate through to the soil beneath the mulch. The overlying mulch layer will inherently slow the evaporation of water from the soil and, in theory will hold more water near the roots of the plant to increase its growth. Mulching material may further help in maintaining even soil temperature, preventing erosion, and in some instances may even enrich the soil.

Traditionally, the protective covering has been formed of loose organic material such as leaves, stalks, straw, sawdust, chips of tree bark, peatmoss and the like. Loose inorganic mulching material such as gravel and rock is also occasionally used However, loose material whether of the organic or inorganic type has presented some major drawbacks.

One of such drawbacks is that they are subject to being blown away by the wind. Furthermore, being relatively small in size, the loose particles have a tendency to be worked into the soil. In either case, the mulch material as such is lost. Also, the mulch formed by loose inorganic or organic material becomes relatively uneven in thickness so that is fails to give adequate service at some locations.

Loose organic material is further subject to deterioration through decay and bacterial action. In some instances loose organic material may even proove to be detrimental to the underlying soil since it potentially promotes growth of undesired pests and also potentially disturbs the delicate acido-basic balance of the soil.

In an effort to circumvent the above-mentioned disadvantages, mulches formed of sheet materials have been developed. The sheet material is typically formed of woven fabric using, different types of yarns including biodegradable yarns and tubular or hollow core yarns containing agents of material to be released such as fertilizers, pesticides and the like. However, the woven fibrous material suffers from deficiencies including limited flexibility and limitation upon the yards, which may be woven.

In an attempt to overcome some of these problems, covering membranes or foils have been developed. Some prior art membranes typically include membranes made out of high-density polyethylene or polyurethane. However, they are also subject to certain short comings since the membranes are normally so thin that they are weak and are easily broken by walking or other traffic. Also, membranes are inclined to be impermeable so that they prevent the proper application of water and fertilizers to the ground beneath.

The relatively thin foils further suffer from being easily picked up by the wind and displaced. Accordingly, it has been a common practice to weigh the foils down by stones or the like which may be randomly placed on the foils. Notwithstanding the fact that this approach can generally serve to hold the foils in place existing membrane-type mulches have the drawback that with time the foil deteriorates by the effect of sunlight and especially the ultraviolet component of sunlight.

Furthermore, the wind can act upon the foil strip between the individual stones which serve to hold the strip in place and in combination with the weakening of the foil by ultraviolet light the wind can damage the foil that is it can tear the foil so that the anti-vegetation effect will be lost. Accordingly, there exists a need for an improved mulching structure.

Advantages of the present invention include the fact that the mulching structure in accordance with the present invention allows irrigation of water to easily reach the ground to water the plants while conserving the water by retarding evaporation from the soil. Indeed, the proposed mulching structure is specifically configured to allow both liquids such as irrigation water and liquid fertilizers as well as relatively small particle to fertilizers to reach the plant.

One of the main features of the present invention resides in that it optimized the collection of liquids such as rain falling thereunto and evenly distributes it at predetermined locations. The proposed structure is also specifically adapted to reduce the amount of light rays reaching the soil. The proposed mulching structure thus promotes plant growth while providing weed control.

Its specific reinforced structure will allow a predetermined amount of traffic thereon without damaging the structure. Furthermore, it is optionally provided with a light-reflecting surface so as to increase the overall amount of sunlight imparted on the growing plant.

The mulch device is preferably formed out of an inorganic material so as to prevent decay but may optionally be formed out of biodegradable material if needed. Another main feature of the present invention resides in that the mulch structure in accordance with the present invention is specifically configured so as to be manufacturable using conventional high output production processes such as injection molding so as to provide for a high level of production at a relatively low cost.

proposed structure is adapted to be easaly installed and removed to and from a ground surface without requiring special tooling or manual dexterity. In at least one embodiment of the invention the structure can be dissassembled for maintenance threof.

In accordance with the present invention, there is provided a mulching structure for allowing an irrigating fluid to reach a soil surface while providing shade to the soil surface from light rays emanating from a light source, the mulching structure comprising a first wall made out of a substantially impermeable material, the first wall defining a first wall outer surface, the first wall being provided with a first wall aperture extending therethrough; a second wall made out of a substantially impermeable material, the second wall defining a second wall outer surface facing in a direction generally oriented opposite the first wall outer surface, the second wall having a second wall aperture extending therethrough; a wall spacing means extending between the first and second walls for maintaining the first and second walls in a wall spaced relationship relative to each other; a fluid guiding and light ray blocking means extending between the first and second wall apertures for allowing through flow of the fluid therebetween while preventing through passage of the light rays from the first wall outer surface to the second wall outer surface.

Preferably, the first wall and the second wall extend in a generally parallel relationship relative to each other; the first wall apertures being configured, sized and positionned so that its geometrical projection on the second wall in a direction perpendicullar to the first wall is offset relative to the second wall aperture; the second wall apertures being configured, sized and positionned so that its geometrical projection on the first wall in a direction perpendicullar to the second wall is offset relative to the first wall aperture.

Conveniently, the mulching structure further comprises a fluid biasing means formed on the first wall for biasing towards the first wall aperture a volume of the fluid having reached the first wall outer surface.

In at least one embodiment of the invention, the first and second wall respectively further define corresponding first and second wall inner surfaces; the wall spacing means includes a spacing protuberance extending from the second wall inner surface, the spacing protuberance defining a protuberance distal section; a spacing recess formed in the first wall inner surface, the spacing recess being configured and sized for receiving the protuberance distal section when the first and second walls are in the wall spaced relationship relative to each other.

Preferably, the spacing protuberance and the spacing recess are configured and sized so as to provide a locking action therebetween. Conveniently, the spacing protuberance and the spacing recess are configured and sized so as to provide a releasable locking action therebetween.

In at least one embodiment of the invention, the spacing protuberance distal section as a generally "arrow-head" cross-sectional configuration defining a dital tip and a pair of retaining shoulders, the spacing recess defining a corresponding pair of retaining ledges for abuttingly contacting the retaining shoulders when the protuberance distal section is inserted within the spacing recess.

Conveniently, the first wall is formed of an integral piece of material defining a base segment and an integrally extending bulging segment, the bulging segment protruding outwardly so as to define an outwardly convex and inwardly concave configuration, the contour of the inwardly concave configuration forming the spacing recess.

Preferably, the first wall defines a guiding groove formed on the first wall outer surface, the guiding groove being configured and positionned so as to guide the fluid towards the first wall aperture. Conveniently, the first wall aperture intercepts the guiding groove.

Preferably, the first wall is formed of an integral piece of material the guiding groove being formed of an inwardly recessed segment. Conveniently, the inwardly recessed segment has a generally "V"-shaped cross-sectional configuration defining an apex, the inwardly recessed segment being configured and sized so that the apex abutingly contacts the second wall. The inwardly recessed segment thus also acts as a solidifying means for solidifying the wall spacing means, In at least one embodiment of the invention the wall spacing means includes a pair of spacing walls extending from the first wall outer surface to the second wall outer surface, the spacing walls being positionned in a predetermined spaced and generally parallel spacing wall relationship relative to each other, each of the spacing walls defining corresponding spacing wall first and second peripheral edges; the fluid guiding and light ray blocking means including a pair of fluid guiding and light ray blocking walls extending generally diagonally relative to the spacing walls between the first and second wall apertures, each of the fluid guiding and light ray blocking walls defining corresponding fluid guiding and light ray blocking wall first and second peripheral edges; the fluid guiding and light ray blocking wall first peripheral edges and the spacing wall first peripheral edges together defining the first wall; the fluid guiding and light ray blocking wall second peripheral edges and the spacing wall second peripheral edges together defining the second wall.

Preferably, the spacing walls and the fluid guiding and light ray blocking walls are made of an integral piece of material. Preferably, the fluid guiding and light ray blocking wall first peripheral edges extend in a generally perpendicular relationship relative to the spacing wall first peripheral edges; the fluid guiding and light ray blocking wall second peripheral edges extend in a generally perpendicular relationship relative to and the spacing wall second peripheral edges.

In at least one embodiment of the invention, the fluid guiding and light ray blocking walls have a generally rectilinear cross-sectional configuration. In at least one other embodiment of the invention, each of the fluid guiding and light ray blocking walls has a generally "L"-shaped cross-sectional configuration defining a guiding and blocking wall first segment extending substantially perpendicularly from a corresponding fluid guiding and light ray blocking wall first peripheral edge in a direction leading towards the second wall and a guiding and blocking wall second segment extending substantially diagonally from the guiding and blocking wall first segment to a corresponding guiding and light ray blocking wall second peripheral edge.

Optionally, the first wall outer surface has light reflective characteristics. Optionally, the first wall, the second wall, the wall spacing means and the fluid guiding and light ray blocking means are made of a biodegradable material.

Preferably, the first and second wall toghether form a panel, the first and second walls having a plurality of corresponding first and second wall apertures extending therethrough; the panel defining a panel peripheral edge, the panel peripheral edge being provided with a peripheral recess.

BRIEF DESCRIPTION OF THE DRAWINGS

An embodiment of the present invention will now be disclosed, by way of example, in reference to the following drawings in which:

FIG. 10, in a partial transversal cross sectional view with sections taken out, illustrates the configuration of the mulching structure shown in FIG. 9.

DETAILED DESCRIPTION

Figure 1:
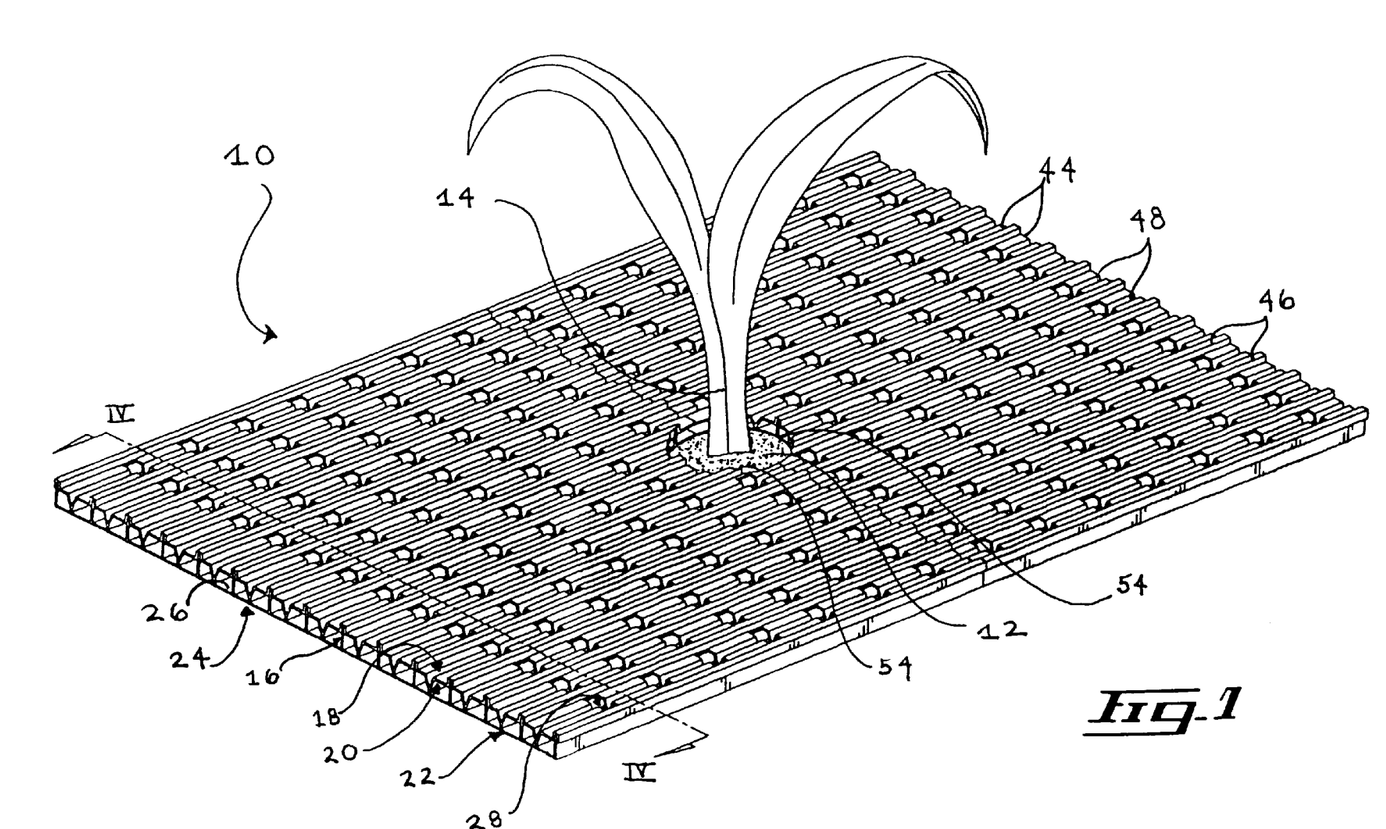
FIG. 1, in a perspective view, illustrates a mulching structure in accordance with an embodiment of the present invention resting on a ground surface and surrounding the stem portion of a plant.

Referring to FIG. 1, there is shown a mulching structure 10 in accordance with an embodiment of the present invention. The mulching structure 10 is shown abuttingly resting on a ground surface 12 and used for enhancing the growth of the plant 14.

The mulching structure 10 includes a first wall 16 made out of a substantially impermeable material. The first wall 16 defines a first wall outer surface 18 and an opposed first wall inner surface 20. The mulching structure 10 also includes a second wall 22. The second wall 22, in turn, defines a second wall outer surface 24 facing in a direction generally opposite the first wall outer surface 18 and a second wall inner surface 26 facing the corresponding first wall inner surface 20. The first and second wall 16, 22 each have at least one corresponding first and second wall aperture 28, 30 extending therethrough.

The mulching structure 10 also includes a wall spacing means extending between the first and second walls 16, 22 for maintaining the latter in a wall spaced relationship relative to each other. The mulching structure 10 further includes a fluid guiding and light rays blocking means extending between the first and second wall apertures 28, 30 for allowing through flow of an irrigating fluid such as rainwater 32 therebetween while preventing through passage of light rays from the first wall outer surface 18 to the second wall outer surface 24.

Preferably, the first and second walls 16, 22 extend in a generally parallel relationship relative to each other. Also preferably, the first wall apertures 28 are configured, sized and positioned so that their geometrical projection on the second wall 22 in a direction generally perpendicular to the first wall 16 is offset relative to the second wall apertures 30. Similarly, the second wall apertures 30 are configured, sized and positioned so that their geometrical projection on the first wall 16 in a direction perpendicular to the second wall 22 is offset relative to the first wall apertures 28.

In the embodiment shown in FIGS. 1 through 8, the wall spacing means includes at least one spacing protuberance 34 extending from the second wall inner surface 26. Each spacing protuberance 34 defines a corresponding protuberance distal section positioned away from the second wall inner surface 26. The wall spacing means also preferably includes at least one corresponding spacing recess 36 formed in the first wall inner surface 20.

Each spacing recess 36 is configured and sized for receiving a corresponding protuberance distal section when the first and second walls 16, 22 are in their wall spaced relationship relative to each other. Preferably, the spacing protuberances 34 and corresponding spacing recesses 36 are configured and sized so as to provide a locking action therebetween. Preferably, the locking action is of the releasable type.

In the embodiment shown in FIGS. 1 through 6, the spacing protuberances 34 have a generally flat and parallelepiped-shaped configuration. In the embodiment shown in FIGS. 7 and 8, the spacing protuberances 34' are provided with protuberance distal sections having a generally arrow-head cross sectional configuration. In turn, the generally arrow-head cross sectional configuration of the protuberance distal sections each define a distal tip 38 and a pair of retaining shoulders 40.

Figure 7:
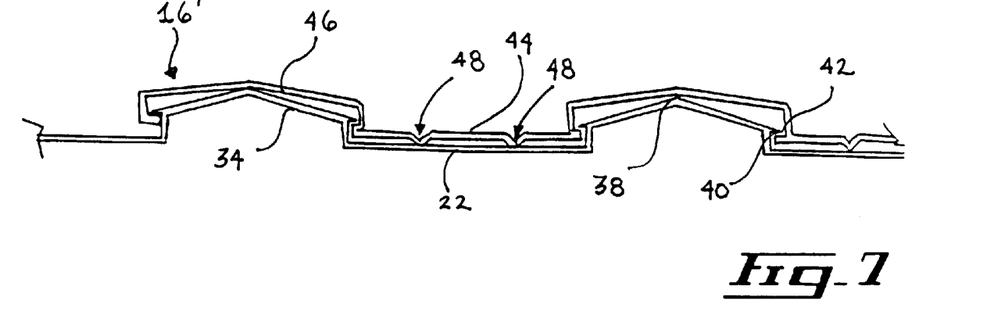
FIG. 7, in a partial transversal cross sectional view with sections taken out, illustrates an alternative cross sectional configuration of the top and bottom walls part of the mulching structure shown in FIG. 1 in an assembled configuration.
Figure 8:
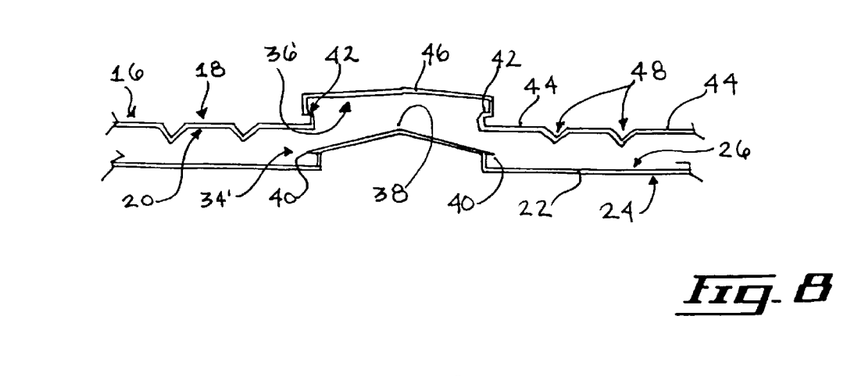
FIG. 8, in a partial transversal cross sectional view with sections taken out, illustrates an alternative cross sectional configuration of the top and bottom walls part of the mulching structure shown in FIG. 1 about to be assembled together.

Correspondingly, the spacing recesses 36' each define a pair of retaining ledges 42 for abuttingly contacting a corresponding pair of retaining shoulders 40 when the protuberance distal sections are inserted within corresponding spacing recesses 36' as shown in FIG. 7.

Preferably, the first wall 16 is formed out of an integral piece of material defining at least one base segment 44 and an integrally extending bulging segment 46. The bulging segment 46 protrudes outwardly from the level of the base segment 44 so as to define an outwardly convex and inwardly concave configuration. The contour of the inwardly concave configuration preferably forms the spacing recess 36.

The mulching structure 10 is preferably further provided with a fluid biasing means formed on the first wall 16 for biasing towards at least one of the first wall apertures 28 a volume of the fluid 32 having reached the first wall outer surface 18. The fluid biasing means includes at least one guiding groove 48 formed on the first wall outer surface 18.

Figure 2:
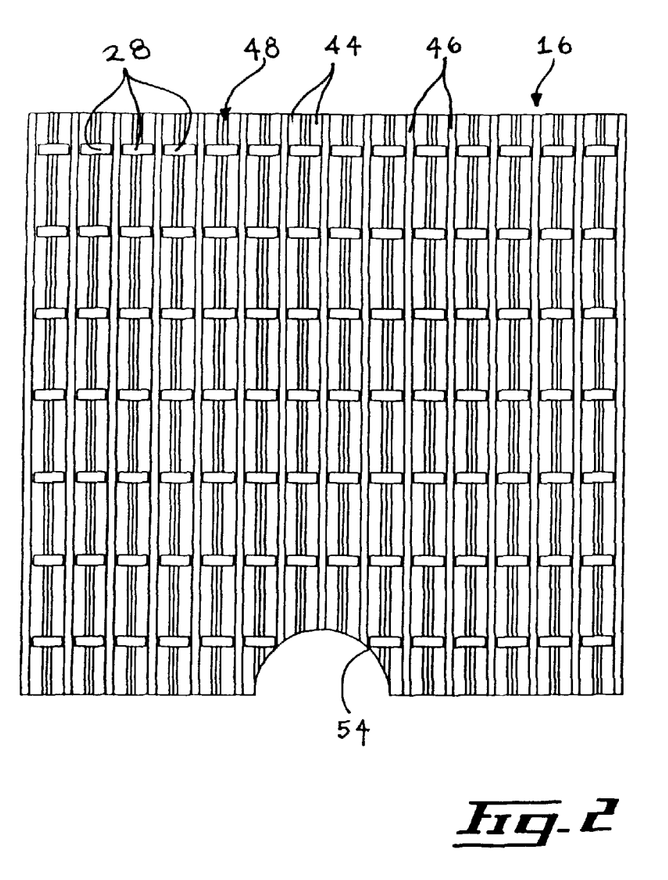
FIG. 2, in a partial top view with sections taken out, illustrates part of the top wall of the mulching structure shown in FIG. 1.
Figure 3:
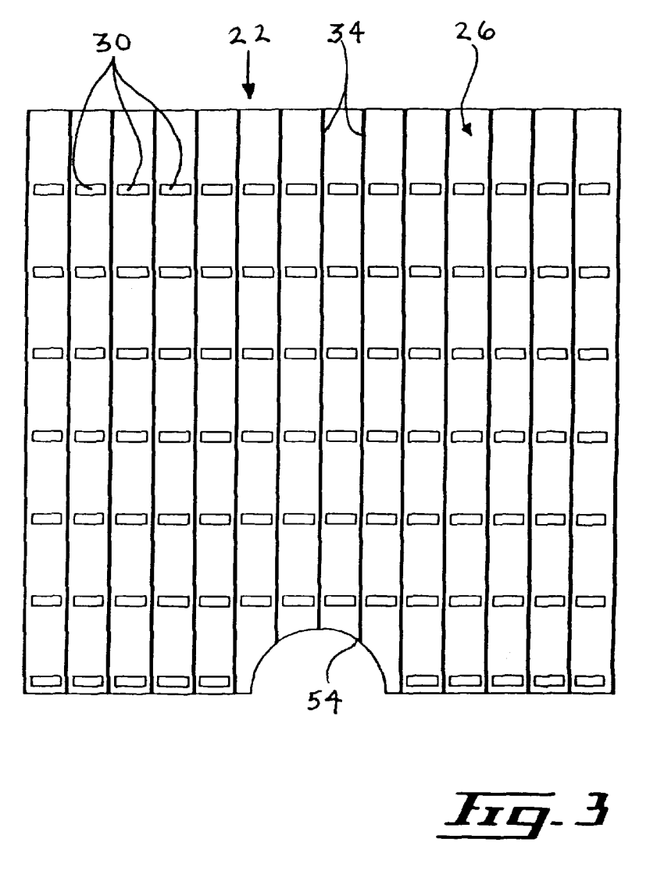
FIG. 3, in a partial top view with sections taken out, illustrates part of the bottom wall of the mulching structure shown in FIG. 1.
Figure 4:
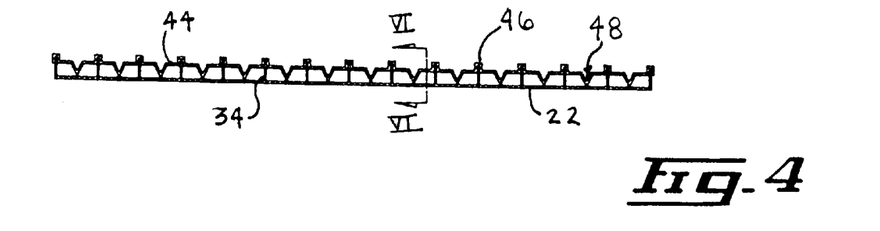
FIG. 4, in a transversal cross sectional view taken along arrows IV—IV of FIG. 1, illustrates the top and bottom walls shown in FIGS. 2 and 3 in an assembled configuration.
Figure 5:
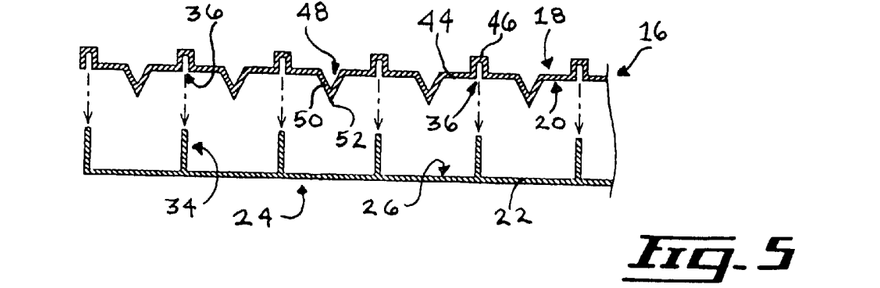
FIG. 5, in a partial cross sectional view with sections taken out, illustrates part of the top and bottom walls shown in FIGS. 2, 3 and 4 about to be assembled together.
Figure 6:
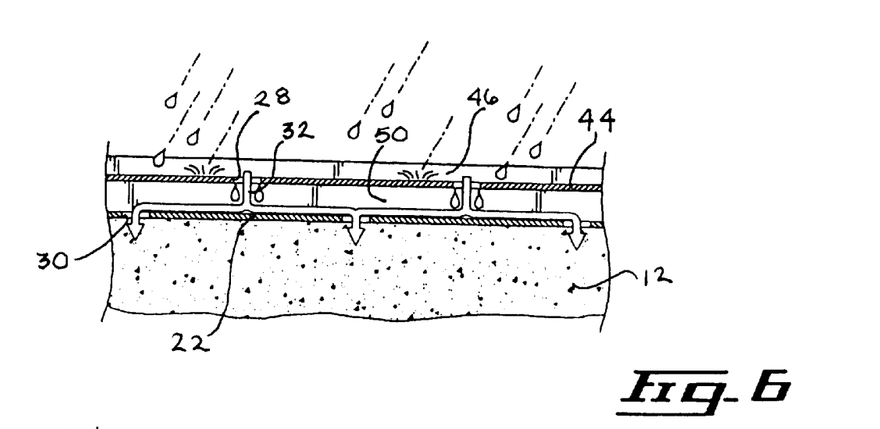
FIG. 6, in a partial transversal cross sectional view partly taken along arrows VI—VI of FIG. 4, illustrates the mulching structure shown in FIG. 1 having raindrops falling thereon, the raindrops being shown flowing through the mulching structure towards a ground surface.

Each guiding groove 48 is configured and positioned so as to guide the fluid 32 towards a corresponding first wall aperture 28. Preferably, as shown in FIGS. 1 and 2, each first wall aperture 28 intercepts a corresponding guiding groove 48. Typically, although by no means exclusively, the first wall apertures 28 extend between adjacent bulging segments 46 transversally across a corresponding guiding groove 48.

Each guiding groove 48 is preferably defined by corresponding recess segment 50 extending integrally from an adjacent base segment 44. Each recess segment 50 preferably has a generally "V" shaped cross sectional configuration defining an apex 52. Each recess segment 50 is preferably configured and sized so that its corresponding apex 52 abuttingly contacts a section of the second wall inner surface 26 when the first and second walls 16, 22 are in their wall spaced configuration relative to each other.

The second wall 22 preferably has a generally flat configuration. The spacing protuberances 34, 34' preferably extend integrally from intervening second wall segments. As shown more specifically in FIGS. 1 through 4, each mulching structure 10 preferably includes first and second walls 16, 22 defining a plurality of corresponding first and second wall apertures 28, 30, spacing protuberances and recesses 34, 36, bulging segments 46 and guiding grooves 48.

In use, irrigation fluid 32 such as rain droplets initially fall onto the first wall outer surface 18. The fluid 32 is biased towards the first wall apertures 18 by the guiding grooves 38. The fluid 32 drops by gravity into the spacing 36 between the first and second walls 16, 22 before flowing out of the second wall apertures 30 and reaching the soil 12 for irrigating the plant 14.

Since the first and second wall apertures 28, 30 are offset relative to each other, light rays emanating from the sun or other light sources cannot penetrate directly through both the first and second wall apertures 28, 30. The mulching structure 10 thus provides shading which reduces overall soil evaporation.

The fluid biasing means favors through flow of the irrigating fluid from the first wall outer surface 18 to the soil 12 thus reducing the length of time during which the irrigating fluid 32 remains on the first wall outer surface 18 and consequently reducing the amount of evaporation of the irrigating fluid 32 prior to the latter reaching the soil 12. This feature can prove to be most interesting in situations wherein irrigating fluid is scarce.

Provision for the first and second walls 16, 22 to be releasably locked together, allows an intended user to temporarily separate the first and second walls 16, 22 from each other in order to allow access to the second wall inner surface 26 for cleaning residues which may have accumulated thereon potentially blocking the through-flow of the fluid towards the second wall apertures 30.

Figure 9:
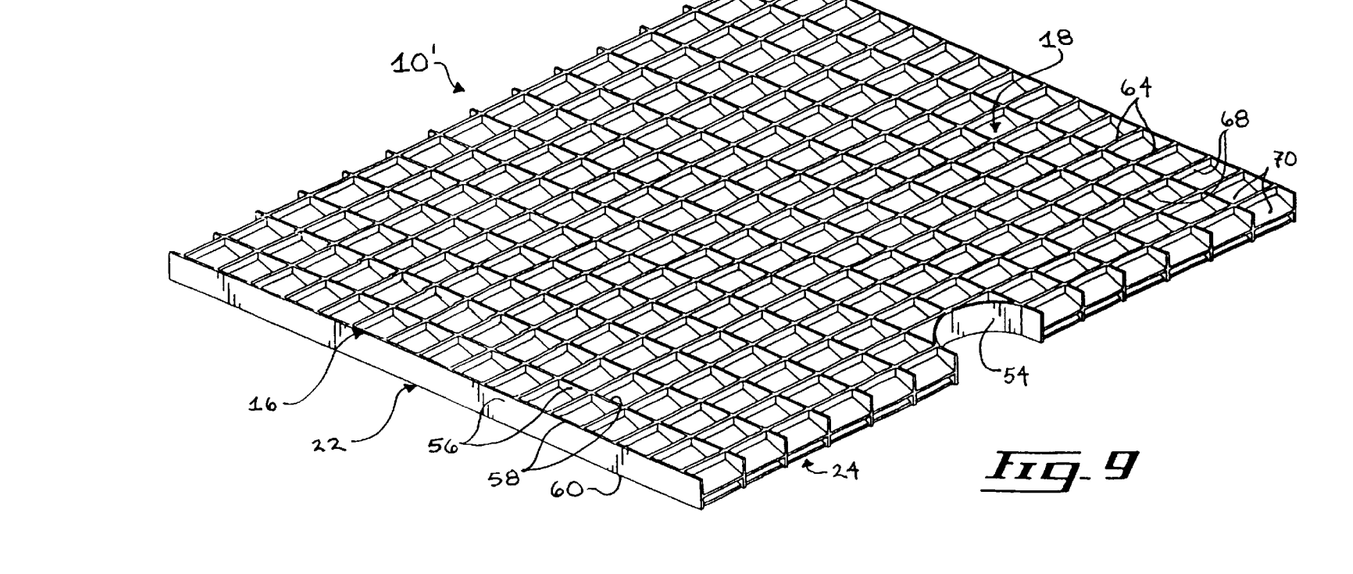
FIG. 9, in a partial perspective view with sections taken out, illustrates a mulching structure in accordance with an alternative embodiment of the present invention.
Figure 10:
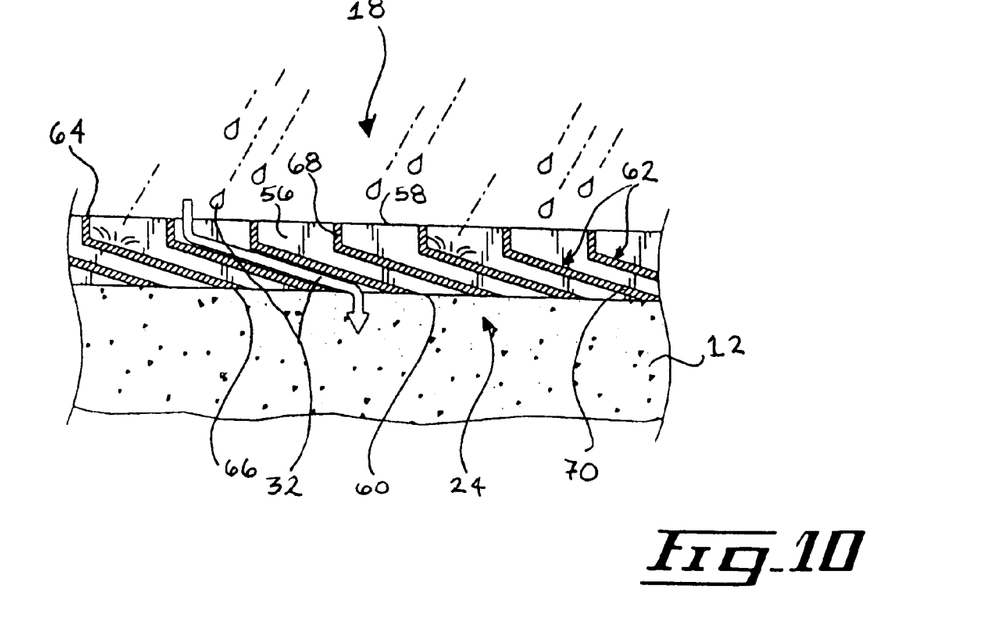
Figure 11:
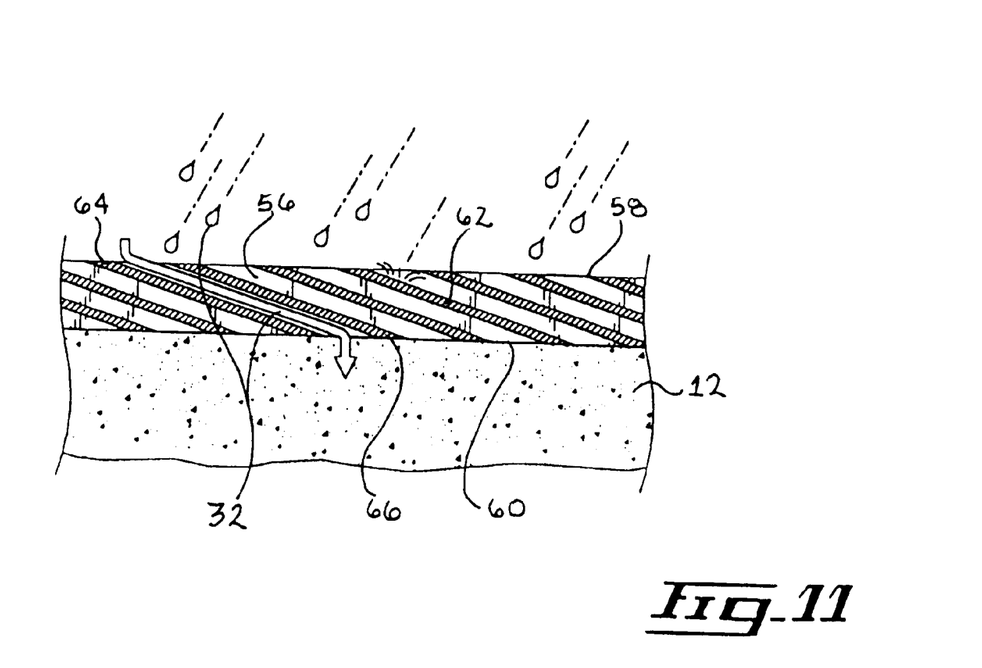
FIG. 11, in a partial cross sectional view with sections taken out, illustrates yet an alternative configuration of the components part of the mulching structure shown in FIG. 9.

Referring now more specifically to FIGS. 9 through 11, there is shown a mulching structure 10' in accordance with an alternative embodiment of the present invention. In this alternative embodiment of the invention the wall spacing means includes a pair of spacing walls 56 extending from the first wall outer surface 18 to the second wall outer surface 24. The spacing walls 56 are positionned in a predetermined spaced and generally parallel spacing wall relationship relative to each other. Each of the spacing walls 56 defines corresponding spacing wall first and second peripheral edges 58, 60.

The fluid guiding and light ray blocking means includes a pair of fluid guiding and light ray blocking walls 62 extending generally diagonally relative to the spacing walls between the first and second wall apertures. Each of the fluid guiding and light ray blocking walls 62 similarly defines corresponding fluid guiding and light ray blocking wall first and second peripheral edges 64, 66.

The fluid guiding and light ray blocking wall first peripheral edges 64 and the spacing wall first peripheral edges 58 together define the first wall 16. The fluid guiding and light ray blocking wall second peripheral edges 66 and the spacing wall second peripheral edges 60 together define the second wall 22. Preferably, the spacing walls 56 and the fluid guiding and light ray blocking walls 62 are made of an integral piece of material.

Preferably, the fluid guiding and light ray blocking wall first peripheral edges 64 extend in a generally perpendicular relationship relative to the spacing wall first peripheral edges 58. Also the fluid guiding and light ray blocking wall second peripheral edges 66 preferably extend in a generally perpendicular relationship relative to the spacing wall second peripheral edges 60.

In the embodiment shown in FIG. 1 the fluid guiding and light ray blocking walls have a generally rectilinear cross-sectional configuration. In the embodiment shown in FIGS. 9 and 10 each of the fluid guiding and light ray blocking walls has a generally "L"-shaped cross-sectional configuration. The "L"-shaped cross-sectional configuration, in turn, defines a guiding and blocking wall first segment 68 extending substantially perpendicularly from a corresponding fluid guiding and light ray blocking wall first peripheral edge 64 in a direction leading towards the second wall 22. The "L"-shaped cross-sectional configuration also defines a guiding and blocking wall second segment 70 extending substantially diagonally from the guiding and blocking wall first segment 68 to a corresponding guiding and light ray blocking wall second peripheral edge 66.

The mulching devices 10, 10' are specifically designed so as to be manufacturable using, conventional forms of manufacturing with relatively inexpensive materials. The first and second walls 16, 22 are preferably integrally formed and also configured so as to have a generally constant cross sectional thickness thus facilitating manufacturing thereof through conventional manufacturing processes such as injection molding or thermoforming of polymeric resins. For example, the mulching devices 10, 10' may be manufactured out of a suitable polymeric resin. Optionally, the mulching devices 10, 10' may be manufactured out of a biodegradable material.

In a preferred embodiment of the invention, the first and second wall 16, 22 toghether form an integral panel and the first and second walls 16, 22 have a plurality of corresponding first and second wall apertures 28, 30 extending therethrough. The first and second wall apertures 28, 30 are preferrably aligned in rows. The panel define a set panel peripheral edges. The panel peripheral edges are optionally provided with a peripheral recess 54. The panels are adapted to be assembled as shown in FIG. 1 with adjacent peripheral recesses 54 forming a plant stem aperture for receiving a plant stem. Although the first and second walls 16, 22 are shown, once assembled, to form panels having a generally square configuration they could form panels having other geometrical configurations without departing from the scope of the present invention.

The first wall outer surface 18 may optionally be provided with light reflective characteristics. For example, the first wall outer surface may be coated with a layer of light reflective pait or a light reflective foil.

The embodiments of the invention in which an exclusive privilege or property is claimed are defined as follows:

1. A mulching structure for allowing an irrigating fluid to reach a soil surface while providing shade to said soil surface from light rays emanating from a light source, said mulching structure comprising:

a first wall made out of a substantially impermeable material, said first wall defining a first wall outer surface, said first wall being provided with a first wall aperture extending therethrough;

a second wall made out of a substantially impermeable material, said second wall defining a second wall outer surface facing in a direction generally oriented opposite said first wall outer surface, said second wall having a second wall aperture extending therethrough;

a wall spacing means extending between said first and second walls for maintaining said first and second walls in a wall spaced relationship relative to each other;

a fluid guiding and light ray blocking means extending between said first and second wall apertures for allowing through flow of said fluid therebetween while preventing through passage of said light rays from said first wall outer surface to said second wall outer surface;

said mulching structure further comprising a fluid biasing means formed on said first wall for biasing towards said first wall aperture a volume of said fluid having reached said first wall outer surface.

2. A mulching structure as recited in claim 1 wherein said first wall, said second wall, said wall spacing means and said fluid guiding and light ray blocking means are made of a biodegradable material.

3. A mulching structure for allowing an irrigating fluid to reach a soil surface while providing shade to said soil surface from light rays emanating from a light source, said mulching structure comprising:

a first wall made out of a substantially impermeable material, said first wall defining a first wall outer surface, said first wall being provided with a first wall aperture extending therethrough;

a second wall made out of a substantially impermeable material, said second wall defining a second wall outer surface facing in a direction generally oriented opposite said first wall outer surface, said second wall having a second wall aperture extending therethrough;

a wall spacing means extending between said first and second walls for maintaining said first and second walls in a wall spaced relationship relative to each other, a fluid guiding and light ray blocking means extending between said first and second wall apertures for allowing through flow of said fluid therebetween while preventing through passage of said light rays from said first wall outer surface to said second wall outer surface;

wherein said first and second wall respectively further define corresponding first and second wall inner surfaces;

said wall spacing means includes a spacing protuberance extending from said second wall inner surface, said spacing protuberance defining a protuberance distal section;

a spacing recess formed in said first wall inner surface, said spacing recess being configured and sized for receiving said protuberance distal section when said first and second walls are in said wall spaced relationship relative to each other.

4. A mulching structure as recited in claim 3 wherein said spacing protuberance and said spacing recess are configured and sized so as to provide a locking action therebetween.

5. A mulching structure as recited in claim 4 wherein said spacing protuberance and said spacing recess are configured and sized so as to provide a releasable locking action therebetween.

6. A mulching structure as recited in claim 4 wherein said spacing protuberance distal section as a generally "arrowhead" cross-sectional configuration defining a distal tip and a pair of retaining shoulders, said spacing recess defining a corresponding pair of retaining ledges for abuttingly contacting said retaining shoulders when said protuberance distal section is inserted within said spacing recess.

7. A mulching structure as recited in claim 3 wherein said first wall is formed of an integral piece of material defining a base segment and an integrally extending bulging segment, said bulging segment protruding outwardly so as to define an outwardly convex and inwardly concave configuration, the contour of said inwardly concave configuration forming said spacing recess.

8. A mulching structure for allowing an irrigating fluid to reach a soil surface while providing shade to said soil surface from light rays emanating from a light source, said mulching structure comprising:

a first wall made out of a substantially impermeable material, said first wall defining a first wall outer surface, said first wall being provided with a first wall aperture extending therethrough;

a second wall made out of a substantially impermeable material, said second wall defining a second wall outer surface facing in a direction generally oriented opposite said first wall outer surface, said second wall having a second wall aperture extending therethrough;

a wall spacing means extending between said first and second walls for maintaining said first and second walls in a wall spaced relationship relative to each other;

a fluid guiding and light ray blocking means extending between said first and second wall apertures for allowing through flow of said fluid therebetween while preventing through passage of said light rays from said first wall outer surface to said second wall outer surface;

wherein said first wall defines a guiding groove formed on said first wall outer surface, said guiding groove being configured and positioned so as to guide said fluid towards said first wall aperture.

9. A mulching structure as recited in claim 8 wherein said first wall aperture intercepts said guiding groove.

10. A mulching structure as recited in claim 8 wherein said first wall is formed of an integral piece of material said guiding groove being formed of an inwardly recessed segment.

11. A mulching structure as recited in claim 10 wherein said inwardly recessed segment has a generally "V"-shaped cross-sectional configuration defining an apex, said inwardly recessed segment being configured and sized so that said apex abutingly contacts said second wall.

* * * * *